US006665411B2

(12) United States Patent
Steenhagen

(10) Patent No.: US 6,665,411 B2

(45) **Date of Patent: *Dec. 16, 2003**

(54) DVE SYSTEM WITH INSTABILITY DETECTION

(75) Inventor: Shawn K. Steenhagen, Cottage Grove, WI (US)

(73) Assignee: Digisonix LLC, Stoughton, WI (US)

( * ) Notice: Subject to any disclaimer, the term of this patent is extended or adjusted under 35 U.S.C. 154(b) by 39 days.

This patent is subject to a terminal disclaimer.

(21) Appl. No.: 09/790,410

(22) Filed: Feb. 21, 2001

(65) Prior Publication Data

US 2002/0136416 A1 Sep. 26, 2002

(51) Int. Cl.[7] ........................ H04R 27/00; H04B 15/00

(52) U.S. Cl. ........................................ 381/93; 381/83

(58) Field of Search ............................ 381/83, 93, 110, 381/71.1, 94.1, 56–59, 66

(56) References Cited

U.S. PATENT DOCUMENTS

| | | | | | |
|---|---|---|---|---|---|
| 4,677,676 | A | | 6/1987 | Eriksson | 381/71.11 |
| 4,677,677 | A | | 6/1987 | Eriksson | 381/71.11 |
| 4,987,598 | A | | 1/1991 | Eriksson | 381/71.11 |
| 5,033,082 | A | | 7/1991 | Eriksson et al. | 379/392 |
| 5,172,416 | A | | 12/1992 | Allie et al. | 381/71.11 |
| 5,206,911 | A | | 4/1993 | Eriksson et al. | 381/71.11 |
| 5,323,459 | A | * | 6/1994 | Hirano | 379/391 |
| 5,377,277 | A | * | 12/1994 | Bisping | 381/94 |
| 5,386,477 | A | | 1/1995 | Popovich et al. | 381/71.11 |
| 5,396,561 | A | | 3/1995 | Popovich et al. | 381/71.11 |
| 5,442,712 | A | * | 8/1995 | Kawamura et al. | 381/83 |
| 5,473,686 | A | * | 12/1995 | Virdee | 379/406.08 |
| 5,621,803 | A | | 4/1997 | Laak | 381/71.11 |
| 5,677,987 | A | * | 10/1997 | Seki et al. | 381/83 |
| 5,680,337 | A | | 10/1997 | Pedersen et al. | 381/71.11 |
| 5,706,344 | A | | 1/1998 | Finn | 381/94.1 |
| 5,710,822 | A | | 1/1998 | Steenhagen et al. | 381/71.12 |
| 5,715,320 | A | | 2/1998 | Allie et al. | 381/71.12 |
| 5,910,994 | A | * | 6/1999 | Lane et al. | 381/93 |
| 6,252,969 | B1 | * | 6/2001 | Ando | 381/83 |
| 6,295,364 | B1 | * | 9/2001 | Finn et al. | 381/110 |

OTHER PUBLICATIONS

*Digital Processing of Speech Signals*, Lawrence R. Rabiner, Ronald W. Schafer, 1978, Bell Laboratories, Inc. Prentice-Hall, pp. 120–126.

*Handbook For Digital Signal Processing*, Sanjit K. Mitra and James F. Kaiser, 1993, John Wiley & Sons, pp. 1193–1195.

* cited by examiner

*Primary Examiner*—Forester W. Isen
*Assistant Examiner*—Laura A. Grier
(74) *Attorney, Agent, or Firm*—Andrus, Sceales, Starke & Sawall, LLP

(57) ABSTRACT

A digital voice enhancement, DVE, communication system includes an instability detector detecting an unstable acoustic feedback condition from a loudspeaker to a microphone by sensing a condition of the electrical signal transmitted from the microphone to the loudspeaker, and a corrective processor responsive to the instability detector to modify the electrical signal to reduce unstable acoustic feedback. The sensed condition may be magnitude, power, or, preferably, the sinusoidal characteristic of the electrical signal, namely the electrical signal becoming sinusoidal in nature.

20 Claims, 4 Drawing Sheets

DVE SYSTEM WITH INSTABILITY DETECTION

BACKGROUND AND SUMMARY OF THE INVENTION

The invention relates to digital voice enhancement, DVE, communication systems, and more particularly to feedback instability detection and corrective action.

The invention may be used in duplex systems, for example as shown in U.S. Pat. No. 5,033,082, and U.S. application Ser. No. 08/927,874, filed Sep. 11, 1997, simplex systems, for example as shown in U.S. application Ser. No. 09/050,511, filed Mar. 30, 1998, all incorporated herein by reference, and in other systems.

The DVE communication system includes a first acoustic zone, a second acoustic zone, a microphone at the first zone, and a loudspeaker at the second zone and electrically coupled to the microphone such that the speech of a person at the first zone can be heard by a person at the second zone as transmitted by an electrical signal from the microphone to the loudspeaker.

Under adverse conditions, instabilities can inadvertently cause feedback in DVE systems. This feedback causes the DVE controller outputs to diverge unbounded at the frequency of instability. The end result is a loud objectionable tonal squeal or screech that grows in magnitude. This is an abnormal operational state of the DVE system which must be detected and suppressed.

The present invention uses signal statistics of the electrical signal transmitted to the loudspeaker to detect a condition of instability. An instability detector detects an unstable acoustic feedback condition from the loudspeaker to the microphone by sensing a condition of the electrical signal transmitted from the microphone to the loudspeaker, and a corrective processor responds to the instability detector to modify the noted electrical signal to reduce unstable acoustic feedback.

DETAILED DESCRIPTION OF THE INVENTION

Figure 1:
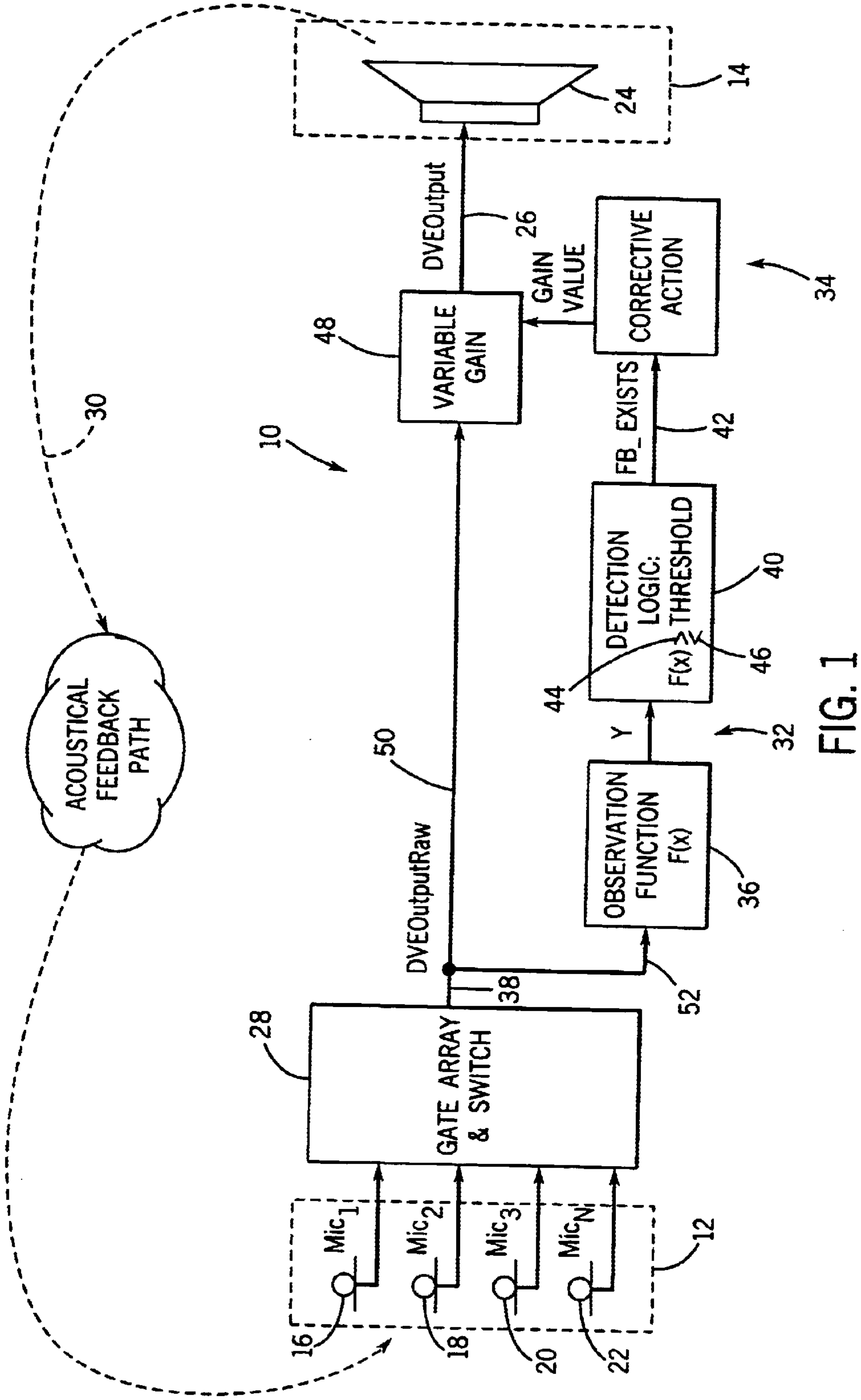
FIG. 1 illustrates a DVE system in accordance with the invention.

FIG. 1 shows a digital voice enhancement, DVE, communication system 10 including a first acoustic zone 12, a second acoustic zone 14, one or more microphones 16, 18, 20, 22, etc. at the first zone, and one or more loudspeakers 24 at the second zone and electrically coupled by channel or line 26 to the microphones such that the speech of a person at a respective microphone at the first zone can be heard by a person at loudspeaker 24 at the second zone. The microphones may be in the same first zone, or each microphone may be in a different first zone, or some combination thereof. Gate array and switch 28 selects which microphone to connect to loudspeaker 24, and is preferably provided by a short-time average magnitude estimating function to detect if a voice signal is present from the respective microphone, though other estimating functions may be used, for example *Digital Processing of Speech Signals,* Lawrence W. Rabiner, Ronald W. Schafer, 1978, Bell Laboratories, Inc., Prentice-Hall, pages 120–126, and also as noted in U.S. Pat. No. 5,706,344, incorporated herein by reference. Loudspeaker 24 is acoustically coupled to the microphones as shown at feedback path 30 such that the microphones are subject to acoustic feedback from loudspeaker 24. An instability detector 32 detects an unstable acoustic feedback condition from loudspeaker 24 to microphone 16 by sensing a condition of the electrical signal transmitted from microphone 16 to loudspeaker 24, and likewise for the remaining microphones. A corrective processor 34 responds to the instability detector to modify the electrical signal transmitted to loudspeaker 24 to reduce unstable acoustic feedback. Instability detector 32 and corrective processor 34 prevent divergence and unbounded growth of the magnitude of the electrical signal at 26 otherwise caused at frequencies of instability in the noted unstable acoustic feedback condition. The noted sensed condition of the electrical signal may be magnitude of the electrical signal greater than a designated threshold, power (magnitude$^2$) of the electrical signal greater than a designated threshold, or, preferably, the sinusoidal characteristic of the electrical signal, i.e. the electrical signal becoming sinusoidal in nature, to be described.

In the noted preferred embodiment, instability detector 32 is provided by a model 36 modeling the noted electrical signal from output 38 of the gate array and switch 28 as a filter model with filter coefficients, for example as in U.S. Pat. Nos. 4,677,676, 4,677,677, 4,987,598, 5,033,082, 5,172,416, 5,206,911, 5,386,477, 5,396,561, 5,621,803, 5,680,337, 5,706,344, 5,710,822, 5,715,320, all incorporated herein by reference. An unstable feedback condition in the DVE system is detected by determining that the DVE output at 38 has become sinusoidal, or tonal, in nature. The tonal condition is identified by continually modeling the DVE output at 38 as a second order all pole filter and monitoring one of the filter coefficients. Under normal voice output conditions, the variation of such filter coefficient is large. At the onset of feedback, the DVE output at 38 becomes sinusoidal, and the variation of the filter coefficient becomes very small. Instability detector 32 includes detection logic 40 monitoring the filter coefficient and outputting a feedback indicator signal at 42 to corrective processor 34 in response to a given condition of the filter coefficient. In contrast to the above noted method of outputting feedback indicator signal 42 when the magnitude or power of the electrical signal is greater than a designated threshold as shown at greater-than sign 44, the tonal sinusoid sensing of the preferred detection method outputs feedback indicator signal 42 when the variation of the noted filter coefficient is below a designated threshold as shown at less-than sign 46. Model 36 is preferably a second order all pole filter model, as noted above. Detection logic 40 outputs feedback indicator signal 42 to corrective processor 34 when the variation of the filter coefficient is below a designated threshold. Corrective processor 34 includes a variable gain element 48 applying variable gain to the electrical signal after sensing by instability detector 32. The corrective processor responds to the noted sensed condition of the electrical signal to vary the gain applied at 48. The electrical signal at 38 is supplied to parallel branches 50 and 52. Branch 50 is supplied to variable gain element 48 and loudspeaker 24. Branch 52 is supplied to instability detector 32 and corrective processor 34.

Figure 2:
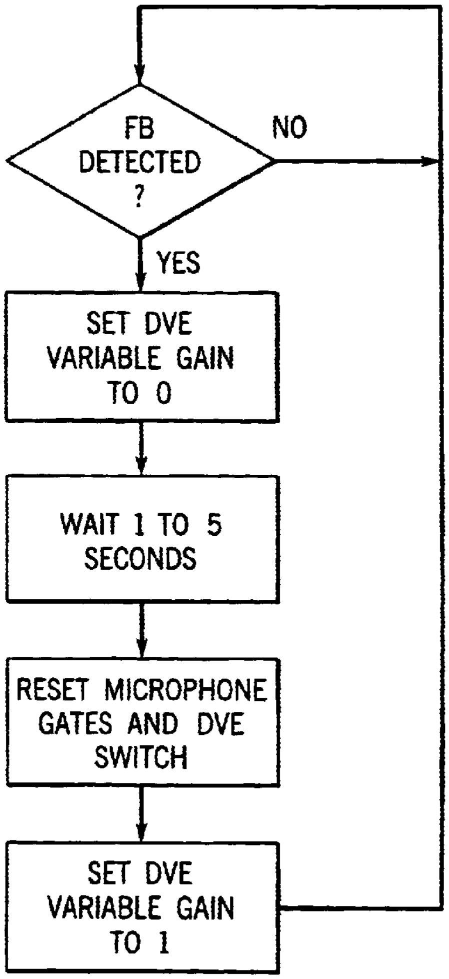
FIG. 2 illustrates a corrective method in accordance with the invention.
Figure 3:
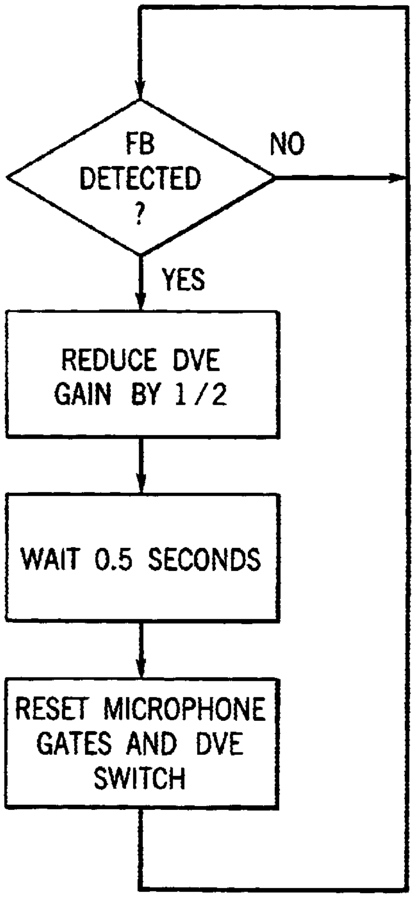
FIG. 3 illustrates another corrective method in accordance with the invention.

In one embodiment, corrective processor 34 responds to the noted sensed condition from instability detector 32 by reducing gain, FIG. 2, e.g. setting the DVE variable gain at element 48 to zero, then instituting a delay, e.g. wait 1 to 5 seconds, then resetting the gate array and switch 28 to an initialized condition such that the latter may again sense the active microphone, and then increasing the gain, e.g. setting the DVE variable gain to 1 or back to its value prior to the reducing of the gain. In another embodiment, FIG. 3, the gain is reduced, e.g. by half, and then a delay is instituted, e.g. 0.5 seconds, and then the gate array and switch is reset, and then monitoring of the instability detector is resumed.

Figure 4:
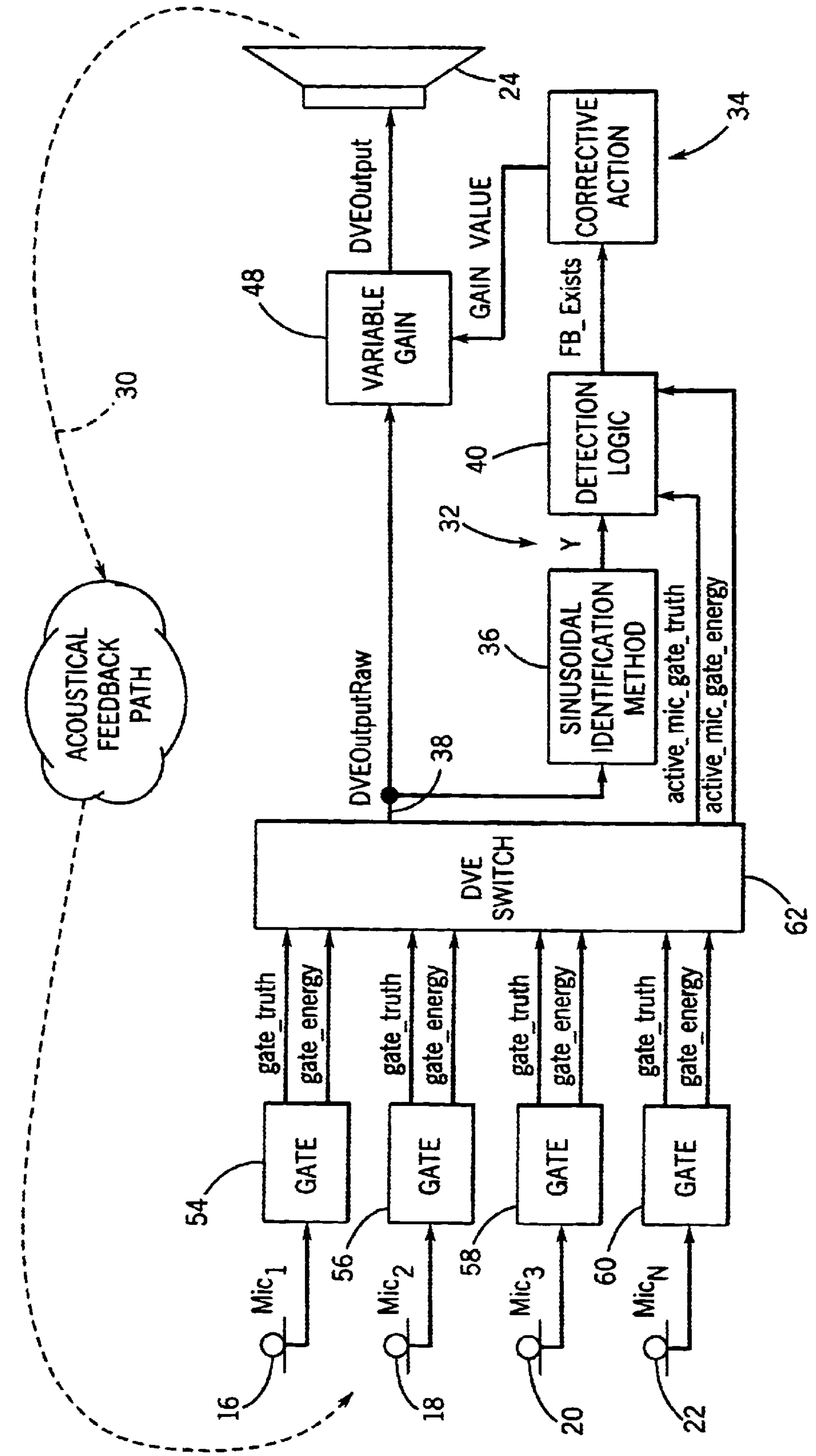
FIG. 4 illustrates another embodiment of a DVE system in accordance with the invention.

In preferred form, instability detector 36 uses Prony's method of sinusoidal identification as described in *Handbook For Digital Signal Processing,* Sanjit K. Mitra and James F. Kaiser, 1993, John Wiley & Sons, pages 1193–1195. This method is used to identify the sinusoidal components of an input signal. FIG. 4 shows implementation and uses like reference numerals from above where appropriate to facilitate understanding. Gate array and switch 28 is broken out into its respective gates 54, 56, 58, 60, etc., one for each microphone, and DVE switch component 62. The detector uses the Prony method for a number of poles equal to 2 to match the electrical signal to a single sinusoid, which requires a data sample size of only 4, which small size is considered desirable.

Prony's method with p=2, N=4 gives the a coefficients of an all pole model:

$$a=[1\ a1\ a2]$$

where $$x(n)\equiv[x(k-3)x(k-2)x(k-1)x(k)]\equiv[x(0)x(1)x(2)x(3)]$$

$$a2=\frac{-x(3)\cdot x(1)+x(2)^2}{x(1)^2-x(0)\cdot x(2)}$$

$$a1=\frac{-x(2)-a2\cdot x(0)}{x(1)}$$

The roots of a tell the pole locations, and the angle of the pole is the frequency of the sinusoid.

The DVE output is continually modeled using Prony's method, looking for a trend in the results that indicate a tone is present. The "results" to be monitored can be the a1 & a2 coefficients, the location of the poles, the amplitude of the poles, etc., all of which will stabilize when the signal is sinusoidal. In the preferred embodiment, only the a2 coefficient need be calculated. The present detection method is based on the fact that under feedback conditions when the DVE output 38 is sinusoidal, the a2 coefficient becomes very stable compared to all other normal operating conditions, i.e. under normal operating conditions the a2 coefficient is random. This method of feedback detection offers the following advantages over other detection methods: a) such method creates a single parameter whose value answers the question as to whether the output is sinusoidal; b) such method differentiates between abnormal sinusoidal signals and normal voice signals; c) such method is not prone to false detections that occur in output power monitoring methods under conditions of wind noise, door slams and microphone thumps; and d) such method requires a buffer size of only four data samples, as compared to buffer sizes of 512 or more data samples required by fast Fourier transform techniques or correlation based statistical methods.

Figure 5:
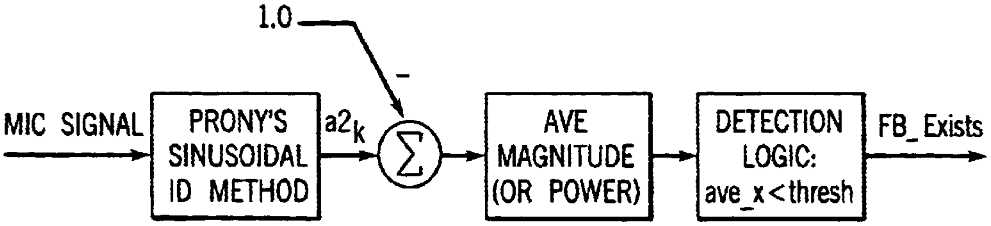
FIG. 5 illustrates a detection method in accordance with the invention.

In one form, the detection method compares the a2 coefficient to 1.0, FIG. 5. In a pure tone, the second order all pole model is of the form $$a(z)=1+2\cos\theta\cdot z^{-1}+z^{-2}\ \text{or}\ [a0\ a1\ a2]=[1\ 2\cos\theta 1]$$

Therefore, when the signal is tonal in nature, a2 will equal 1. The detection method observes the average magnitude of the difference of a2 and 1.0. The average magnitude is obtained using a typical averaging equation:

$$avg\_mag(k+1)=avg\_mag(k)+1/(tau*fs)*\ (abs(\text{input}(k))-avg\_mag(k))$$

wherein input(k)=a2(k)−1.0 and a2(k) is calculated from Prony's equation shown above.

Figure 6:
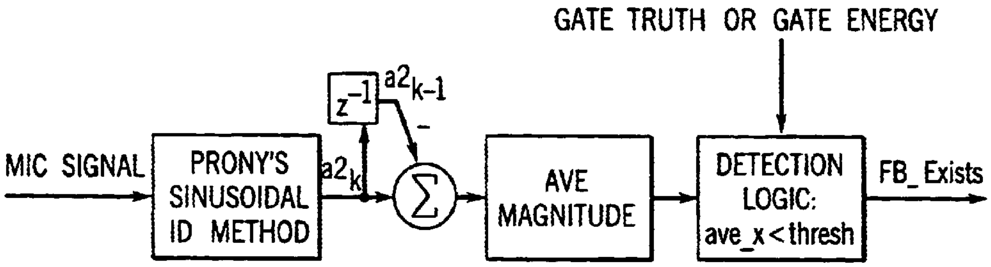
FIG. 6 illustrates another detection method in accordance with the invention.

In another form, FIG. 6, the method uses the fact that under sinusoidal conditions the a2 coefficient is very stable, i.e. its difference about its mean value is small. This characteristic is used to detect tonal or periodic signals by measuring the average magnitude of a2 (k)−a2(k−1). The gate truth and gate energy signals indicate whether there is voice activity and the amount of power on the respective microphone, respectively, and the active mic gate truth and active mic gate energy signals provide the noted signals for comparison for the active microphone. The gate information could be used to only enable the detection logic when there is signal or voice activity from the microphone and/or when signal power or energy from the microphone is above a given level, i.e. the detection logic is enabled to output the feedback indicator signal to the corrective processor only by an activity signal from the microphone, i.e. active mic or gate truth signal, and/or signal energy or power from the microphone above a given level, i.e. active mic gate energy. This will avoid detection "falses" when the input signal is zero or near zero.

Figure 7:
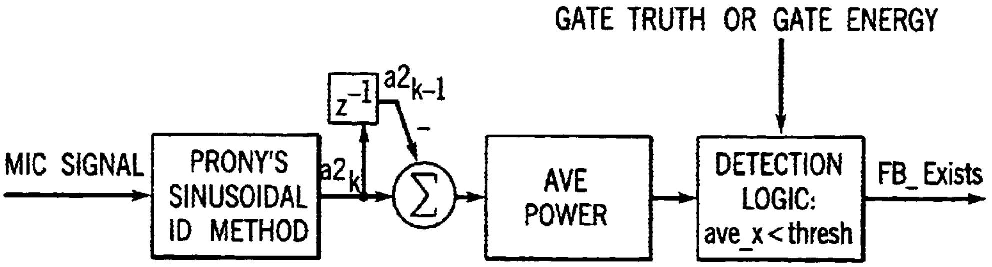
FIG. 7 illustrates another detection method in accordance with the invention.

FIG. 7 shows a modification of the above method of FIG. 6 and is more robust. FIG. 7 measures the variance of the a2 coefficient. The variance of a signal is defined as the $E\{X^2\}-(E\{X\})^2$. For zero mean signals, $(E\{X\}=0)$, the variance is simply $E\{X^2\}$, which is the average power. Since X=a2(k)−a2(k−1) is a simple high pass filter, mean(X)=0, and its variance can be monitored by monitoring its average power $E\{X^2\}$. The average power of the difference is monitored using a typical averaging scheme:

$$avg\_pwr(k+1)=avg\_pwr(k)+1/(tau*fs)*(\text{input}(k)^2-avg\_pwr(k))$$

wherein input(k)=a2(k)−a2(k−1) and a2(k) is calculated from Prony's equation shown above.

It is recognized that various equivalents, alternatives and modifications are possible within the scope of the appended claims.

What is claimed is:

1. A digital voice enhancement communication system comprising:

a first acoustic zone;

a second acoustic zone;

a microphone at said first zone;

a loudspeaker at said second zone and electrically coupled to said microphone such that the speech of a person at said first zone can be heard by a person at said second zone as transmitted by an electrical signal from said microphone to said loudspeaker, said loudspeaker being acoustically coupled to said microphone such that said microphone is subject to acoustic feedback from said loudspeaker;

an instability detector detecting an unstable acoustic feedback condition from said loudspeaker to said microphone by sensing a condition of said electrical signal transmitted from said microphone to said loudspeaker;

a corrective processor responsive to said instability detector to modify said electrical signal to reduce unstable acoustic feedback, wherein said sensed condition is a sinusoidal characteristic of said electrical signal wherein said sensed condition is said electrical signal becoming sinusoidal in nature, and wherein said instability detector comprises:

a model modeling said electrical signal as a filter model with filter coefficients;

detection logic monitoring one of said filter coefficients and outputting a feedback indicator signal to said corrective processor in response to a given condition of said filter coefficient, wherein said detection logic outputs said feedback indicator signal to said corrective processor when the variation of said filter coefficient is below a designated threshold, and wherein said detection logic outputs said feedback indicator signal to said corrective processor when the magnitude of the variation of said filter coefficient is below said designated threshold.

2. The invention according to claim 1 wherein said detection logic outputs said feedback indicator signal to said corrective processor when the average magnitude of the variation of said filter coefficient is below said designated threshold.

3. A digital voice enhancement communication system comprising:

a first acoustic zone;

a second acoustic zone;

a microphone at said first zone;

a loudspeaker at said second zone and electrically coupled to said microphone such that the speech of a person at said first zone can be heard by a person at said second zone as transmitted by an electrical signal from said microphone to said loudspeaker, said loudspeaker being acoustically coupled to said microphone such that said microphone is subject to acoustic feedback from said loudspeaker;

an instability detector detecting an unstable acoustic feedback condition from said loudspeaker to said microphone by sensing a condition of said electrical signal transmitted from said microphone to said loudspeaker;

a corrective processor responsive to said instability detector to modify said electrical signal to reduce unstable acoustic feedback, wherein said sensed condition is a sinusoidal characteristic of said electrical signal wherein said sensed condition is said electrical signal becoming sinusoidal in nature, and wherein said instability detector comprises:

a model modeling said electrical signal as a filter model with filter coefficients;

detection logic monitoring one of said filter coefficients and outputting a feedback indicator signal to said corrective processor in response to a given condition of said filter coefficient, wherein said detection logic outputs said feedback indicator signal to said corrective processor when the variation of said filter coefficient is below a designated threshold, and wherein said detection logic outputs said feedback indicator signal to said corrective processor when the power of the variation of said filter coefficient is below said designated threshold.

4. The invention according to claim 3 wherein said detection logic outputs said feedback indicator signal to said corrective processor when the average power of the variation of said filter coefficient is below said designated threshold.

5. A digital voice enhancement communication system comprising:

a first acoustic zone;

a second acoustic zone;

a microphone at said first zone;

a loudspeaker at said second zone and electrically coupled to said microphone such that the speech of a person at said first zone can be heard by a person at said second zone as transmitted by an electrical signal from said microphone to said loudspeaker, said loudspeaker being acoustically coupled to said microphone such that said microphone is subject to acoustic feedback from said loudspeaker;

an instability detector detecting an unstable acoustic feedback condition from said loudspeaker to said microphone by sensing a condition of said electrical signal transmitted from said microphone to said loudspeaker;

a corrective processor responsive to said instability detector to modify said electrical signal to reduce unstable acoustic feedback, wherein said sensed condition is a sinusoidal characteristic of said electrical signal wherein said sensed condition is said electrical signal becoming sinusoidal in nature, and wherein said instability detector comprises:

a model modeling said electrical signal as a filter model with filter coefficients;

detection logic monitoring one of said filter coefficients and outputting a feedback indicator signal to said corrective processor in response to a given condition of said filter coefficient, wherein said detection logic outputs said feedback indicator signal to said corrective processor when the magnitude of the difference between said filter coefficient and a given value is below a designated threshold.

6. The invention according to claim 5 wherein said detection logic outputs said feedback indicator signal to said corrective processor when the average magnitude of the difference between said filter coefficient and a given value is below a designated threshold.

7. The invention according to claim 5 wherein said given value is 1.0.

8. A digital voice enhancement communication system comprising:

a first acoustic zone;

a second acoustic zone;

a microphone at said first zone;

a loudspeaker at said second zone and electrically coupled to said microphone such that the speech of a person at said first zone can be heard by a person at said second zone as transmitted by an electrical signal from said microphone to said loudspeaker, said loudspeaker being acoustically coupled to said microphone such that said microphone is subject to acoustic feedback from said loudspeaker;

an instability detector detecting an unstable acoustic feedback condition from said loudspeaker to said microphone by sensing a condition of said electrical signal transmitted from said microphone to said loudspeaker;

a corrective processor responsive to said instability detector to modify said electrical signal to reduce unstable acoustic feedback, wherein said sensed condition is a sinusoidal characteristic of said electrical signal wherein said sensed condition is said electrical signal becoming sinusoidal in nature, and wherein said instability detector comprises:

a model modeling said electrical signal as a filter model with filter coefficients;

detection logic monitoring one of said filter coefficients and outputting a feedback indicator signal to said corrective processor in response to a given condition of said filter coefficient, wherein said detection logic outputs said feedback indicator signal to said corrective processor when the power of the difference between said filter coefficient and a given value is below a designated threshold.

9. The invention according to claim 8 wherein said detection logic outputs said feedback indicator signal to said corrective processor when the average power of the difference between said filter coefficient and a given value is below a designated threshold.

10. The invention according to claim 8 wherein said given value is 1.0.

11. A method for detecting and reducing instability in a digital voice enhancement communication system having a first acoustic zone, a second acoustic zone, a microphone at said first zone, a loudspeaker at said second zone and electrically coupled to said microphone such that the speech of a person at said first zone can be heard by a person at said second zone as transmitted by an electrical signal from said microphone to said loudspeaker, said loudspeaker being acoustically coupled to said microphone such that said microphone is subject to acoustic feedback from said loudspeaker, said method comprising detecting an unstable acoustic feedback condition from said loudspeaker to said microphone by sensing a condition of said electrical signal transmitted from said microphone to said loudspeaker, and responding to said sensed condition to modify said electrical signal to reduce unstable acoustic feedback, wherein said sensed condition is a sinusoidal characteristic of said electrical signal wherein said sensed condition is said electrical signal becoming sinusoidal in nature, and comprising modeling said electrical signal as a filter model with filter coefficients, and monitoring one of said filter coefficients and generating a feedback indicator signal to modify said electrical signal in response to a given condition of said filter coefficient, and comprising generating said feedback indicator signal when the variation of said filter coefficient is below a designated threshold, and comprising generating said feedback indicator signal when the magnitude of the variation of said filter coefficient is below said designated threshold.

12. The method according to claim 11 comprising generating said feedback indicator signal when the average magnitude of the variation of said filter coefficient is below said designated threshold.

13. A method for detecting and reducing instability in a digital voice enhancement communication system having a first acoustic zone, a second acoustic zone, a microphone at said first zone, a loudspeaker at said second zone and electrically coupled to said microphone such that the speech of a person at said first zone can be heard by a person at said second zone as transmitted by an electrical signal from said microphone to said loudspeaker, said loudspeaker being acoustically coupled to said microphone such that said microphone is subject to acoustic feedback from said loudspeaker, said method comprising detecting an unstable acoustic feedback condition from said loudspeaker to said microphone by sensing a condition of said electrical signal transmitted from said microphone to said loudspeaker, and responding to said sensed condition to modify said electrical signal to reduce unstable acoustic feedback, wherein said sensed condition is a sinusoidal characteristic of said electrical signal wherein said sensed condition is said electrical signal becoming sinusoidal in nature, and comprising modeling said electrical signal as a filter model with filter coefficients, and monitoring one of said filter coefficients and generating a feedback indicator signal to modify said electrical signal in response to a given condition of said filter coefficient, and comprising generating said feedback indicator signal when the variation of said filter coefficient is below a designated threshold, and comprising generating said feedback indicator signal when the power of the variation of said filter coefficient is below said designated threshold.

14. The method according to claim 13 comprising generating said feedback indicator signal when the average power of the variation of said filter coefficient is below said designated threshold.

15. The method according to claim 14 comprising generating said feedback indicator signal when the magnitude of the difference between said filter coefficient and a given value is below a designated threshold.

16. The method according to claim 15 comprising generating said feedback indicator signal when the average magnitude of the difference between said filter coefficient and a given value is below a designated threshold.

17. The method according to claim 15 wherein said given value is 1.0.

18. The method according to claim 14 comprising generating said feedback indicator signal when the power of the difference between said filter coefficient and a given value is below a designated threshold.

19. The method according to claim 18 comprising generating said feedback indicator signal when the average power of the difference between said filter coefficient and a given value is below a designated threshold.

20. The method according to claim 19 wherein said given value is 1.0.

* * * * *